(12) United States Patent
Shon et al.

(10) Patent No.: US 8,620,929 B2
(45) Date of Patent: Dec. 31, 2013

(54) CONTEXT BASED RESOURCE RELEVANCE

(75) Inventors: Aaron Shon, Manassas, WA (US);
Matthew Zitzmann, East Palo Alto, CA (US); Clyde D. McQueen, III, Seattle, WA (US); John Burge, Santa Clara, CA (US); Michael Skinner, Seattle, WA (US)

(73) Assignee: Google Inc., Mountain View, CA (US)

( * ) Notice: Subject to any disclaimer, the term of this patent is extended or adjusted under 35 U.S.C. 154(b) by 557 days.

(21) Appl. No.: 12/541,222

(22) Filed: Aug. 14, 2009

(65) Prior Publication Data

US 2011/0040768 A1 Feb. 17, 2011

(51) Int. Cl.
*G06F 7/00* (2006.01)
*G06F 17/30* (2006.01)

(52) U.S. Cl.
USPC ........................................... 707/749; 707/732

(58) Field of Classification Search
USPC .................................. 707/749, 999.006, 732
See application file for complete search history.

(56) References Cited

U.S. PATENT DOCUMENTS

| | | | | |
|---|---|---|---|---|
| 5,640,553 A | * | 6/1997 | Schultz | 707/999.005 |
| 5,835,905 A | * | 11/1998 | Pirolli et al. | 707/999.003 |
| 6,651,057 B1 | | 11/2003 | Jin et al. | |
| 2004/0054654 A1 | * | 3/2004 | Nomiyama et al. | 707/999.001 |
| 2004/0059746 A1 | * | 3/2004 | Error et al. | 707/999.102 |
| 2006/0004752 A1 | | 1/2006 | Harel et al. | |
| 2007/0067317 A1 | * | 3/2007 | Stevenson | 707/999.1 |
| 2007/0239680 A1 | * | 10/2007 | Oztekin et al. | 707/999.003 |
| 2008/0071929 A1 | * | 3/2008 | Motte et al. | 709/246 |
| 2010/0057716 A1 | * | 3/2010 | Stefik et al. | 707/E17.108 |

FOREIGN PATENT DOCUMENTS

| | | |
|---|---|---|
| JP | 2006235729 A | 9/2006 |
| KR | 2006080125 A | 7/2006 |

OTHER PUBLICATIONS

Notification of Transmittal of the International Search Report and the Written Opinion of the International Searching Authority, or the Declaration for PCT/US2010/045273 dated Apr. 28, 2011, 9 pages.
Notification Concerning Transmittal of International Preliminary Report on Patentability for PCT/US2010/045273 dated Feb. 23, 2012.
Patent Examination Report No. 1; Australia; Examiner; Publication Mailed; Feb. 5, 2013; 2010282449; 2.
Korean Examiner, Notice of Preliminary Rejection (w/English translation) for KR 10-2012-7003870 dated Apr. 24, 2013, 5 pages.

* cited by examiner

*Primary Examiner* — Apu Mofiz
*Assistant Examiner* — Bryan Walker
(74) *Attorney, Agent, or Firm* — Fish & Richardson P.C.

(57) ABSTRACT

A resource context system ("context system") computes a contextual profile for a resource based on selection data for the resource and contextual profiles of other resources that are identified as relevant to the resource. The contextual profile includes values that specify measures of relevance of the resource to each of a plurality of corresponding topics. The contextual profile is provided to a processing system, such as an advertisement management system or a search system that can identify topics for which the resource is relevant based on the contextual profile.

13 Claims, 6 Drawing Sheets

CONTEXT BASED RESOURCE RELEVANCE

BACKGROUND

The present disclosure relates to data processing.

Users can locate resources (i.e., webpages, images, articles about a particular topic, audio files, video files, and other interactive media) that are available on the Internet by submitting a search query to a search engine. The search query can be, for example, a text query that includes words representing topics of resources that the user is attempting to locate. The search system identifies resources that correspond to the search query and provides search results that include references to the resources. The resources can be identified, for example, based on relevance scores that are computed for the resources relative to the search queries. The search system can compute relevance scores for the resources based, for example, on text that is associated with the resources, user selection data for the resources when previously referenced in search results, and other contextual data indicative of topics for which the resource is relevant.

Relevance scores or other measures of relevance or context may also be used by advertisement management systems to select relevant advertisements for presentation with resources. For example, an advertisement management system can select advertisements having keywords that match topics to which a resource is identified as relevant and provide the selected advertisements for presentation with the resource.

SUMMARY

A resource context system computes a contextual profile for a resource based on selection data for the resource and contextual profiles of other resources that were identified as relevant to the resource. The contextual profile includes values that specify measures of relevance of the resource to each of a plurality of corresponding topics. The contextual profile is provided to processing systems, such as an advertisement management system or a search system that can identify topics for which the resource is relevant based on the contextual profile.

In general, one aspect of the described subject matter can be implemented in methods that include selecting a first contextual profile for a first resource, the first contextual profile specifying topic values that represent measures of relevance of the first resource for each of a plurality of topics; identifying a second resource that are identified as relevant to the first resource; computing a second contextual profile for the second resource based on a function of the first contextual profile; and providing the second contextual profile to a processing system that is configured to identify the second resource as relevant to at least one topic based on at least one topic value in the second contextual profile exceeding a topic value threshold. This and other implementations can include corresponding systems, apparatus, and computer program products.

Implementations may include one or more of the following features. For example, the second resource can be a resource that is a co-selected resource for the first resource, and the second contextual profile can be computed by initializing topic values for the second contextual profile to initial topic values. The methods can include computing a contextual profile result based on a function of the initial topic values and the first contextual profile; normalizing topic scores of the contextual profile result to normalized topic scores; comparing each normalized topic score to a topic score threshold; adjusting normalized topic scores having a value that is less than the topic score threshold to a reference value; and re-normalizing the topic scores based on the adjusted topic scores.

Particular implementations can realize one or more of the following advantages. For example, contextual profiles can be computed for resources based on contextual profiles of resources with which the resources have been sequentially selected. The resources for which contextual profiles can be computed include resources for which little or no contextual data is available. The computed contextual profiles can be provided to processing systems that can identify resources as relevant to topics based on the computed contextual profiles.

The details of one or more implementations are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

A resource context system ("context system") computes a contextual profile for a resource based on selection data for the resource and contextual profiles of other resources that are identified as relevant to the resource. In some implementations, the resources are connected by a link based on selection of the resources during a same user session. The contextual profile includes values that specify measures of relevance of the resource to each of a plurality of corresponding topics. The contextual profile for the resource is provided to processing systems, such as an advertisement management system or a search system that can identify topics for which the resource is relevant based on the contextual profile.

An online environment in which search services and advertisement targeting services are provided is described below. A context system that computes a contextual profile for resources is described with reference to this online environment as an independent system. However, the context system can be implemented as a subsystem or component of a search system, an advertisement management system or any other processing system that can utilize the contextual profiles of resources.

Figure 1:
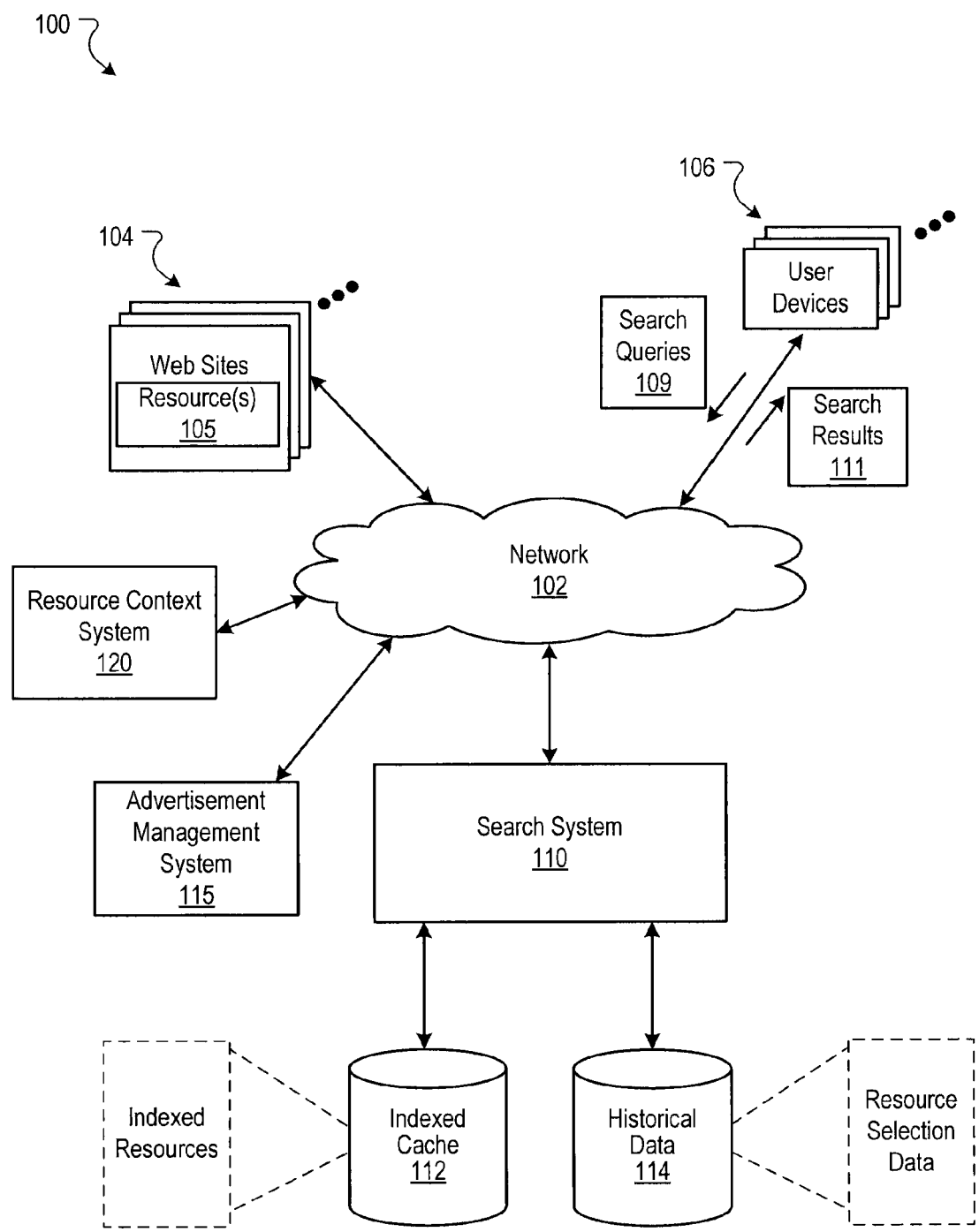
FIG. 1 is a block diagram of an example environment in which a search system provides search services and an advertisement management system provides targeted advertisement services.

FIG. 1 is a block diagram of an example environment 100 in which a search system 110 provides search services and an advertisement management system 115 provides targeted advertisement services. The example environment 100 includes a network 102 such as a local area network (LAN), wide area network (WAN), the Internet, or a combination thereof. The network connects web sites 104, user devices 106, the search system 110, and the advertisement management system 115. The online environment 100 may include many thousands of web sites 104 and user devices 106.

A web site 104 includes one or more resources associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, which may be an entity that manages and/or owns the web site.

A resource is any data that can be provided by the web site 104 over the network 102 and that is associated with a resource address. Resources include HTML pages, word processing documents, and portable document format (PDF) documents, images, video, and feed sources, to name just a few. The resources can include content, such as words, phrases, images and sounds, and may include embedded information, such as meta information and hyperlinks, and/or embedded instructions, such as JavaScript scripts.

Each resource has an addressable storage location that can be uniquely identified. The addressable location is addressed by a resource locator, such as a universal resource locator (URL).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

To facilitate searching of these resources, the search system 110 identifies the resources by crawling and indexing the resources provided by the publishers on the web pages 104. Data about the resources can be indexed based on the resource to which the data corresponds. The indexed and, optionally, cached copies of the resources are stored in an indexed cache 112.

The user devices 106 submit search queries 109 to the search system 110. In response, the search system 110 accesses the indexed cache 112 to identify resources that are relevant to the search query 109. The search system 110 identifies the resources in the form of search results 111 and returns the search results 111 to the user devices 106 in search results pages. A search result 111 is data generated by the search system 110 that identifies a resource that is responsive to a particular search query, and includes a link to the resource. An example search result 111 can include a web page title, a snippet of text or a portion of an image extracted from the web page, and the URL of the web page.

The search results are ranked based on scores related to the resources identified by the search results, such as information retrieval ("IR") scores, and optionally a separate ranking of each resource relative to other resources (a "page rank" score). In some implementations, the IR scores are computed from dot products of feature vectors corresponding to a search query 109 and a resource, and the ranking of the search results is based on relevance scores that are a combination of the IR scores and page quality scores. The search results 111 are ordered according to these relevance scores and provided to the user device according to the order.

The user devices 106 receive the search results pages e.g., in the form of one or more web pages, and render the pages for presentation to users. In response to the user selecting a link in a search result at a user device 106, the user device 106 requests the resource identified by the link. The web site 104 hosting the resource receives the request for the resource from the user device 106 and provides the resource to the requesting user device 106.

Search queries 109 submitted during user sessions are stored in a data store such as the historical data store 114. Selection data specifying actions taken in response to search results provided during the user sessions are also stored in a data store such as the historical data store 114. These actions can include whether a search result was selected and/or a "dwell time" associated with the selection (i.e., a time period between the selection and a subsequent selection). The data stored in the historical data store 114 can be used to map search queries 109 submitted during user sessions to resources that were identified in search results 111 and the actions taken by users. For example, the historical data store 114 may include an ordered list of resources that were selected for presentation during the user session.

A user session is a period during which data specifying actions taken with respect to resources are associated with a same session identifier. The period of a user session can be measured by time, a number of actions taken or some other delineation of user actions. For example, a user session can include user actions with respect to resources over a minute, an hour, a day, or any other time period. Similarly, a user session can include a threshold number of user selections of resources.

Each user session can be associated with a unique session identifier. The unique session identifier can be generated, for example, based on one or more of a user device identifier, a time indicator for the user session, and other data indicative of the context of the user session (e.g., geographic region from which the user session originates). The user device identifier can be, for example, an anonymized identifier, such as a cookie that has been anonymized (i.e., an anonymized string of text that serves as an identifier for the user session), that is associated with a user device 106 to which the user session corresponds. Thus, actions occurring during a user session can be disassociated from the particular user device 106 from which the action originated.

Actions, such as selections of resources, that occur during a particular user session are associated with the same unique session identifier. Additionally, each action occurring during the particular user session can be associated with additional time data indicating a time at which the action occurred. The time can be an absolute time, such as the Greenwich Mean Time at which the action took place, or a time relative to a start of the user session or a time relative to another user action.

User session data specifying the actions that occurred during each user session can be stored in a data store such as the historical data store 114. For example, the user session data can be used to identify sets of resources that were selected during a particular user session, such as, resources that were sequentially selected during a particular user session. Additionally, the user session data can be used to identify resources that are likely relevant to the same topics based on user actions taken with respect to the resources.

The environment 100 also includes an advertisement management system 115. When a resource 105 or search results 111 are requested by a user device 106, the advertisement management system 115 receives a request for advertisements to be provided with the resource 105 or search results 111. The request for advertisements can include characteristics of the advertisement slots that are defined for the requested resource or search results page.

The advertisement management system 110 can select, for presentation, advertisements having characteristics matching the characteristics of advertisement slots and that are identified as relevant to a specified resource or search query. In some implementations, advertisements having targeting keywords that match the topics to which the content of the resource are relevant are selected by the advertisement management system 115 to be provided with the resource.

A targeting keyword can match a topic to which a resource is relevant by having the same textual content ("text") as the topic. For example, an advertisement associated with the targeting keyword "basketball" can be selected for presentation with a resource identified as relating to the topic "basketball." Similarly, the advertisement can be selected for presentation with a search results page provided for the search query "basketball."

A targeting keyword can also match a topic to which a resource is relevant by having text that is identified as being relevant to the topic despite having different text than the specified topic. For example, an advertisement having the targeting keyword "basketball" may also be selected for presentation with a resource identified as relevant to the topic "sports" because basketball is a type of sport, and, therefore, is relevant to the term "sports." In some implementations, the topics to which a resource is relevant are not initially known, for example, because the resource may not include content from which the context of the resource is evident. For example, flash content or image content may not be associated with textual content that indicates the context of the resource The environment 100 also includes a resource context system 120 that includes one or more processors configured to compute contextual profiles for resources based on user session data for the resources. The resource context system 120 analyzes the user session data and/or a weighted graph to identify resources that are likely relevant to a reference resource. The reference resource is a resource that has a reference contextual profile that specifies topics to which content of the resource is identified as relevant. The contextual profile can be, for example, a vector of topic values for corresponding topics, where the topic values represent measures of relevance for the reference resource to the topics.

Resources that are sequentially selected during a particular user session are referred to as co-selected resources. Sequential selection of resources is an indicator that the co-selected resources are likely relevant to the same topics. Therefore, sequential selections of a reference resource and another resource provide an indication that the other resource has content that is relevant to the same topics as those specified by the contextual profile for the reference resource.

The context system 120 computes a contextual profile for co-selected resources of a reference resource based on the contextual profile of the reference resource. Like the contextual profile for the reference resource, the contextual profile for the co-selected resource specifies topic values that represent measures of relevance of the co-selected resource for corresponding topics.

In some implementations, the co-selected resource can be, for example, a resource for which little or no contextual data has been identified. Therefore, the contextual profile for the co-selected resource may be computed based solely on the contextual profiles of reference resources with which the co-selected resource is sequentially selected.

In other implementations, the co-selected resource can be, for example, a resource for which contextual data has been identified, but is not identified as being accurate with at least a threshold likelihood. In these implementations, the contextual profile can be computed based on a function of the contextual profile for reference resources as well as the contextual data for the co-selected resource.

The contextual profile for a co-selected resource can also be computed, for example, based on a frequency with which the co-selected resource is sequentially selected with the reference resource. For example, the contribution of contextual profiles of reference resources for computing the contextual profile of a co-selected reference can be weighted according to a co-selection rate. Computation of contextual profiles for co-selected resources is described in more detail with reference to FIGS. 2 and 6.

In some implementations, the contextual profiles for resources can be used to select resources to be referenced in search results for queries. For example, in response to a search query, a search system can compute a relevance score for a resource based on topic scores of topics that match the search query. In turn, the search system can select a threshold number of resources (e.g., 1000) having the highest relevance scores for search results for the query.

In some implementations, the contextual profiles for resources can also be used to select advertisements for presentation with the resources. For example, an advertisement management system can receive a request for an advertisement to be presented with a resource. In turn, the advertisement management system can identify, from the contextual profile for the resource, the topics for which the resource is relevant and select advertisements having keyword that match the identified topics.

Throughout this document, co-selected resources are used as examples of resources that are likely relevant to the reference resource, and for which a contextual profile can be computed. However, the descriptions in this document can be applied to other resources that are identified as being relevant to the reference resource based on a set of rules that define relevant pairs of resources. For example, any two resources that are selected by the same user within a specified timeframe can be defined as likely to be relevant to one another. Similarly, any two resources that are connected by a link in a weighted graph, as described below can be identified as likely to be relevant to each other.

Figure 2:
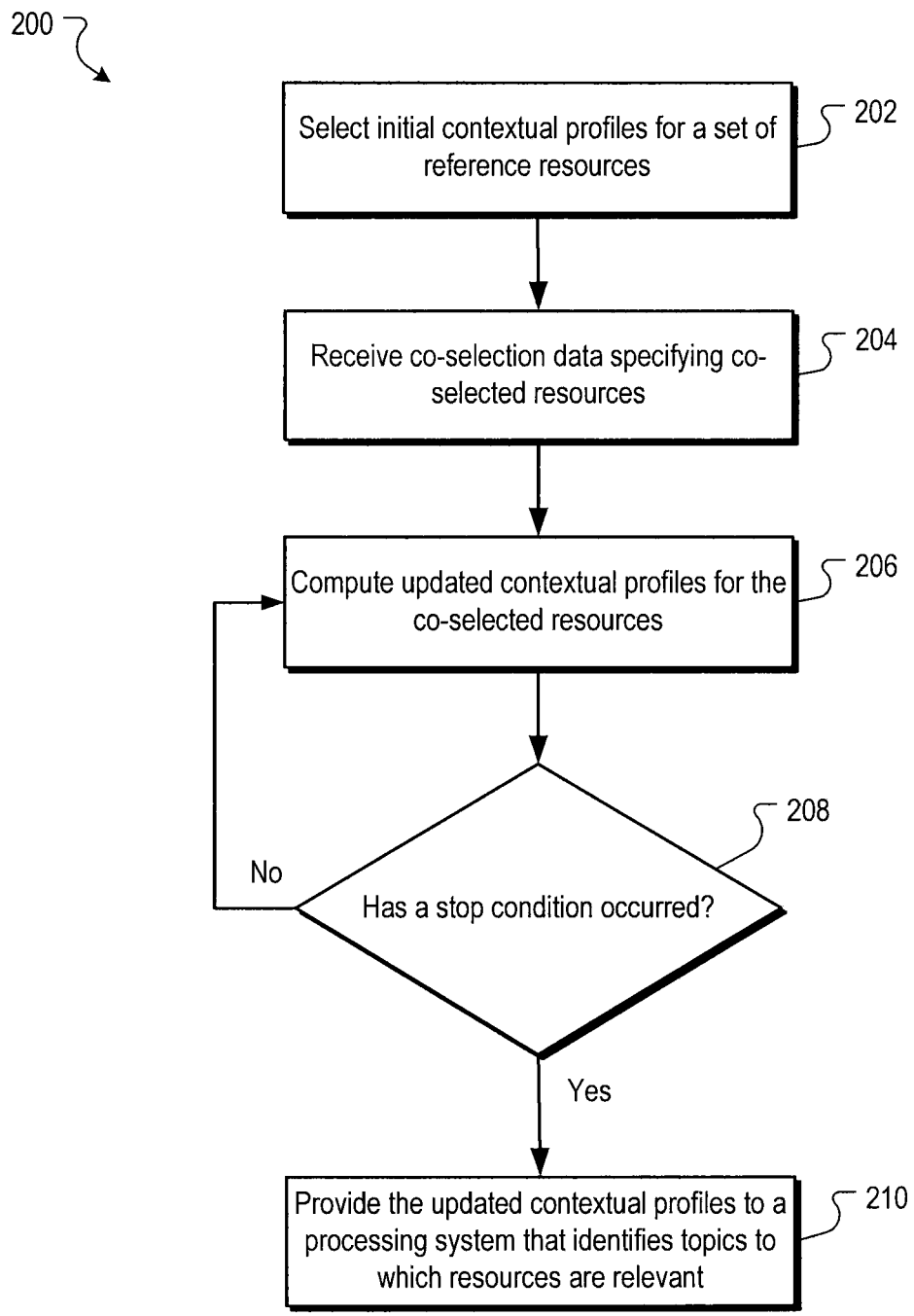
FIG. 2 is a flow chart of an example process for computing a contextual profile for a co-selected resource.

FIG. 2 is a flow chart of an example process 200 for computing a contextual profile for a co-selected resource. The process 200 identifies co-selected resources for reference resources and computes contextual profiles for the co-selected resources based on contextual profiles of the reference resources. The co-selected resource for which the contextual profile is being computed can be a resource for which a contextual profile does not exist, or for which the contextual profile has less than a threshold likelihood of accurately representing the content of the co-selected resource.

The process 200 can be implemented, for example, by the resource context system 120 of FIG. 1. In some implementations, the resource context engine 120 includes one or more processors that are configured to perform operations of the process 200. In other implementations, a computer readable medium can include instructions that, when executed by a computer, cause a computer to perform operations of the process 200.

Initial contextual profiles are selected for a set of reference resources (202). In some implementations, the contextual profiles are vectors of topic values that specify measures of relevance for resources for corresponding topics. For example, a contextual profile for a resource may specify two topics for which the resources is relevant and two corresponding topic values indicative of the relevance of the resource to each of the two topics.

In some implementations, the initial contextual profiles can be generated by a clustering system that provides data specifying topics to which resources are relevant. A clustering system applies clustering algorithms (e.g., k-means clustering) to input data to identify clusters of related input data. For example, a clustering system can receive, as input, vectors of terms and corresponding weights for the terms that indicate a measure of relevance of the terms to a resource.

The input vectors can be generated, for example, based on content of the resources, relevance feedback data for the resources, or other data from which relevant terms and corresponding weights can be identified. The weights of the terms can be computed for example, based on a frequency with which the terms appear in the content of the resource or a frequency with which the resource is identified as relevant to the terms, as specified by the relevance feedback data for the resource.

The relevance feedback for the resource specifies topics and corresponding measures of relevance of the resource to the topics based on user feedback. The relevance feedback data can include, for example, selection data for resources that specify selection rates for a resource when referenced by search results for search queries. The relevance feedback data can also include explicit user feedback specifying terms that are relevant to content of the resource, or measures of relevance of the resource to specified terms. For example, in response to a request for feedback, a user can specify a measure of relevance between a resource and a term that is provided with the resource, or alternatively, provide relevant terms in response to being provided a resource.

The relevance feedback data can be provided to the clustering system, for example, as vectors of terms for which the resource has been identified as relevant and corresponding values for each term representing a measure of the relevance of the resource to the term or topic. Based on the input vectors for the resources, the clustering system identifies clusters of vectors that are within a specified distance of each other to define a cluster of vectors.

The vectors that are included in the same cluster can be analyzed to identify cluster topics to which the resources represented by the vectors in the cluster are relevant, for example, based on a cosine similarity measure for the vectors. The clustering system can then compute a smooth distribution of topics, and assign topic values for topics based on the smooth distribution. The topic values for a particular resource can be formatted as a vector of topic values and stored in a data store as a contextual profile for the particular resource. In turn, context profiles for a set of resources can be selected from the data store.

In some implementations, resources for which no contextual profile is available can be assigned an initial contextual profile that is a vector of initialized values. For example, the initialized values can be set to 0.0 for each component of the contextual profiles for the resources for which no contextual profiles is available.

In some implementations, the set of resources for which contextual profiles are selected include all resources for which a contextual profile is available. In these implementations, confidence values representing likelihoods that the contextual profiles accurately represent content of the resources can be included with the contextual profiles. The confidence values can be provided by the clustering system or computed by the context system. The confidence values can be based, for example, on a distance between a vector of relevance feedback data for the resource and the context profile for the resource, statistical measures of the smoothed distribution of the contextual profile, or review of the contextual profiles by reviewers.

In some implementations, the set of resources for which contextual profiles are received are limited to reference resources for which contextual profiles are identified as accurately representing content of the reference resources with a likelihood measure (i.e., a confidence value) that satisfies a confidence threshold. For example, the contextual profile for the reference resource may have been reviewed by an independent reviewer that has verified that the contextual profile for the reference resource accurately represents content of the resource with a likelihood that meets or exceeds the confidence threshold.

Alternatively, the reference resource can be a resource for which relevance feedback data for the reference resource indicates that the contextual profile for the reference resource accurately represents the topics for which the resource is relevant with a likelihood that satisfies the confidence threshold. For example, the confidence threshold can be satisfied when a vector of relevance feedback data for a resource is within a specified distance of the contextual profile indicating that the contextual profile has at least the threshold likelihood of accurately representing the content of the resource.

The reference resources for which initial contextual profiles are selected can be limited to resources that were sequentially selected with a resource for which a contextual profile is being computed. For example, the reference resources can be resources that were selected for presentation before or following presentation of the resource for which contextual data is not available or for which an existing contextual profile is identifies as not accurately representing the content of the resource. The reference resources can be identified, for example, based on co-selection data.

Co-selection data specifying co-selected resources is received (204). In some implementations, the co-selection data is data specifying resources that were sequentially selected during the same user session. The user session during which the resources were selected for presentation can be identified by identifying unique session identifiers that are associated with selection data for the reference resource. For example, selection data stored in the historical data 114 of FIG. 1 can be obtained for the reference resource. In turn, unique session identifiers associated with the selection data can be analyzed to identify user sessions during which the reference resources was selected for presentation. Other methods of identifying co-selections of resources can also be used, such as logging data that identifies resources from which a user navigated prior to selecting the co-selected resource for presentation. Generation of selection data for a user session is described in more detail with reference to FIG. 3.

Updated contextual profiles are computed for the co-selected resources (206). In some implementations, the updated contextual profiles for the co-selected resources are computed based on a function of the initial contextual profiles for the set of reference resources with which the co-selected resource is sequentially selected. For example, the updated contextual profile for a co-selected resource can be based on a sum of the contextual profiles of reference resources with which the co-selected resource is sequentially selected.

Each sequential selection of a reference resource and a co-selected resource can represent an increased likelihood that the co-selected resource has a contextual profile similar to that of the reference resource. For example, a co-selected reference that is sequentially selected more frequently with a particular reference resource is likely more relevant to the same topics as the reference resource than another less frequently selected co-selected resource. Therefore, in some implementations, each contextual profile for reference resources can be weighted based on a number of sequential selections of the co-selected resource with each of the reference resources.

In some implementations, computation of contextual profiles for the co-selected resources can be facilitated by using a weighted graph to map selections of co-selected resources relative to selection of the reference resource. The reference resource and co-selected resources are represented by nodes in the weighted graph and edges representing sequential selections of co-selected resources connect the nodes. Generation of a weighted graph is described in more detail with reference to FIGS. 4-5.

A function or algorithm by which the contextual profiles are computed can be specified to control the effect of the contextual profiles of the reference resources on the computation of the contextual profiles for the co-selected resources. For example, the function can specify that only topic values of reference resources exceeding a specified threshold are considered for computing the contextual profiles for co-selected resources. Similarly, the function can specify a minimum co-selection rate for reference resources relative to the co-selected resource, confidence thresholds for the contextual profiles of reference resources, or other constraints on the data that are used to compute the contextual profiles for the co-selected resources. One example process for computing contextual profiles is described in more detail with reference to FIG. 6.

Once updated contextual profiles have been computed for the co-selected resources, a determination is made as to whether a stop condition has occurred (208). In some implementations, the stop condition can occur, for example, when a change in the contextual profile for each of the resources over one or more iterations is less than a threshold change (i.e., converges to a vector of values). In these implementations, the contextual profiles can be iteratively generated based on the contextual profiles of the reference resources and/or co-selected resources and the co-selection data for the co-selected resources until the change in the contextual profiles of the co-selected resources converges. In other implementations, the stop condition can occur after the updated contextual profiles have been computed for a specified number of iterations.

When the stop condition has not occurred, updated contextual profiles for the co-selected resources continue to be computed (206). When the stop condition has occurred, the updated contextual profiles are provided to a processing system that identifies topics to which resources are relevant (210). In some implementations, the updated contextual profiles for the resources can be provided to the processing system, for example, as a vector of terms and corresponding weights for the terms that specify a measure of relevance of the terms to the resource.

In other implementations, only terms having a threshold weight are provided to the processing system. Providing terms based on a threshold weight reduces the likelihood that a resource will be identified as relevant to a topic for which the resources is only minimally associated as indicated by the low weight associated with the topic.

The processing system can be, for example, a search system that identifies resources that are relevant to search queries to be referenced in search results for the search queries. The search system can use the contextual profiles for the resources as input for computing relevance scores for resources relative to search queries. For example, topic weights in the contextual profiles can be used to adjust the relevance scores for the resources to reflect increased or decreased relevance to search queries based on the topic weights for topics that match the search query.

The processing system can also be an advertisement management system that selects relevant advertisements for presentation with the resources. The advertisement management system can select advertisements for presentation with resources based on the topic weights of the resources. For example, the advertisement management system can identify topics having topic weights that are greater than a specified threshold as relevant topics for targeting advertisements. In turn, the advertisement management system can select advertisements having targeting keywords that match the relevant topics for presentation with the resource.

In some implementations, the updated contextual profiles are provided in response to a request from the processing device. In these implementations, the request can include data specifying a referring page from which the request for the resource originated. For example, an advertisement management system can request a contextual profile for a particular resource in response to the particular resource being selected for presentation in response to selection of a link to the particular resource from a referring page in which the link was included. In turn, the request from the advertisement management system can include data identifying the particular resource and the referring page from which the particular resource was selected for presentation.

In these implementations, the contextual profile for the particular resource can be weighted or otherwise adjusted to boost topic scores for the particular resource based on a function of the contextual profile of the referring page and the contextual profile of the particular resource. For example, the contextual profile for the referring page may indicate that the referring page has two topic scores of 0.8 and 0.2 corresponding to two topics, $t1$ and $t2$, while the particular resource has topic scores of 0.4 and 0.6 for the same two topics. The resource context system 120 can adjust the contextual profile for the particular resource, for example, by computing a weighted sum of the contextual profiles.

In this example, the adjusted contextual profile for the particular resource may be the result of $0.8*(0.4t1+0.6t2)+0.2*(0.8t1+0.2t2)$, such that 80% of the contextual profile provided in response to the request is based on the updated contextual profile for the particular resource, while 20% of the contextual profile provided in response to the request is based on the contextual profile of the referring page. Thus, the adjusted contextual profile provided in response to the request is $0.48t1+0.52t2$ reflecting an increased likelihood that the particular resource is being selected for presentation based on its relevance to topic 1 because the request originated from a resource that has a higher relevance to topic 1 than that of the particular resource.

Figure 3:
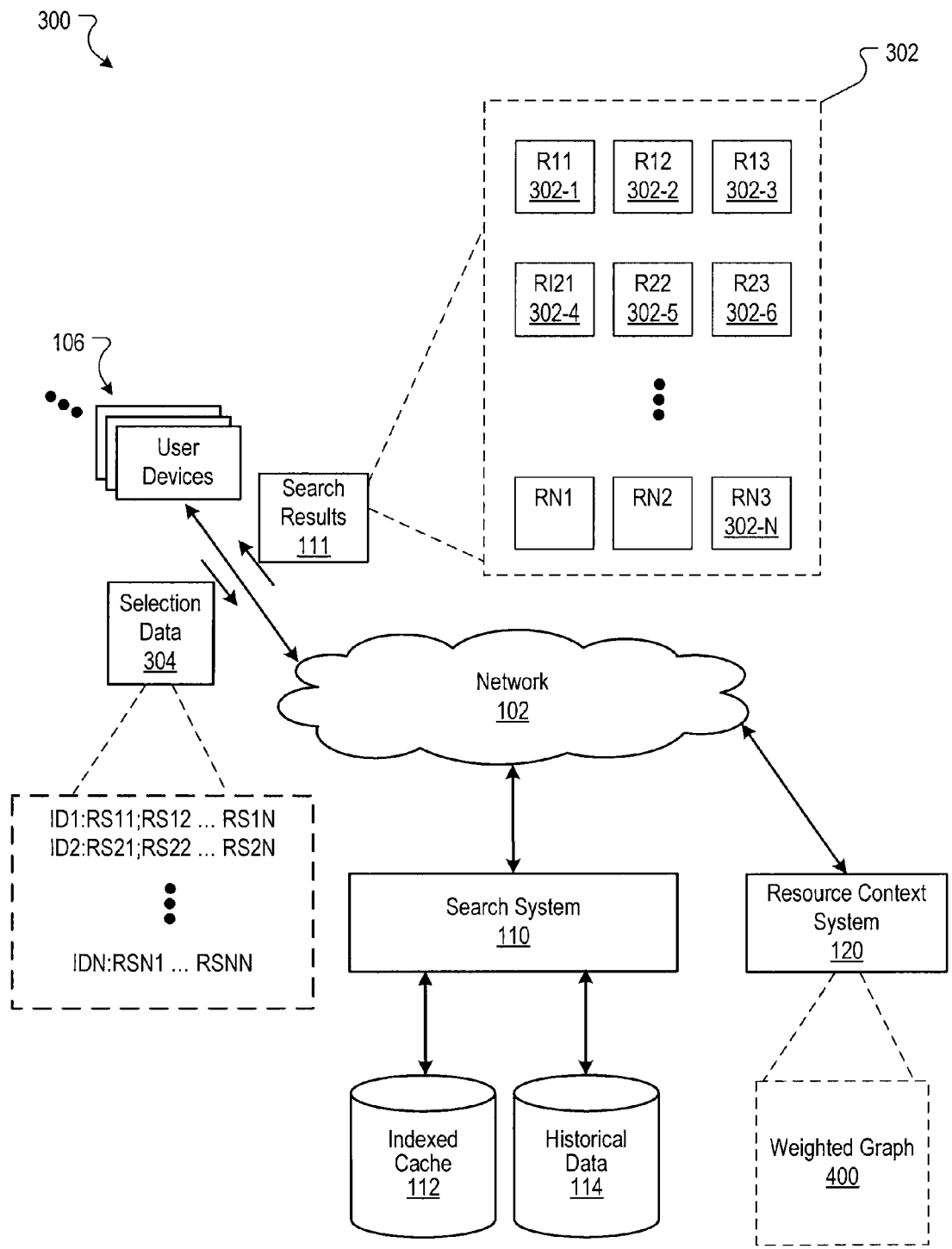
FIG. 3 is a block diagram of an example environment in which user session data are generated and indexed.

FIG. 3 is an example environment 300 in which user session data are generated and indexed. A user session is generally initiated by a user device 106. For example, the user device 106 can submit a search query or another request for search results over the network 102. The request can be associated with an anonymous unique session identifier and processed, for example, by the search engine 110. The search engine 110 provides the user device 106 with search results 302 responsive to the search query. The search results 302 include results 302-1-302-N that are references (e.g., http links) to resources that have been identified by the search system 110 as being relevant to the search query.

User session data identifying the search query and the resources referenced by the search results are associated with a unique session identifier for the user session and stored in the historical data 114. The user session data can include time data that indicates a time at which the user session was initiated (e.g., a time when the search query was received) and/or a time at which the search results 111 were provided to the user device 106.

A user of the user device 106 can select one or more of the results 302-1-302-N from the search results 302. Each selection of results 302-1-302-N generates a request for a resource location that is specified by the selected result. For example, a selection of result 302-1 can generate a request for a web page referenced by the result 302-1. In turn, the web page can be provided to the user device 106 for presentation.

Each selection of a result 302-1-302-N is provided to the search system 110 through the network as selection data 304. The selection data 304 includes data specifying the unique session identifier (e.g., ID1, ID2, . . . , ID3) that identifies the user session that corresponds to the selections. The selection data 304 also includes data identifying the resources (e.g., RS11; RS12, . . . , RS1N) that were selected for presentation, for example, based on selections of results 302-1-302-N. The selection data 304 can further include time data specifying when each of the resources was selected for presentation.

The selection data 304 is obtained by the search system 110 over the network 102 and stored at memory locations of the historical data store 114 that are associated with the unique session identifier. Selection data 304 can be obtained for each user session that requests search results for resources and over the duration of each user session. Thus, selection data for each resource that is selected during multiple user sessions is accessible from the historical data store 114.

The selection data for resources can also be obtained in a similar manner for sequential selection of resources outside of the context of a search system. For example, cookies can be used to identify resource requests and referring pages from which the requests originated. In turn, sequential selections of resources can be identified based on the cookies and stored in the historical data 114.

In some implementations, the resource context system 120 uses the selection data to construct a weighted graph 400 to map aggregate selections of co-selected resources relative to selections of a reference resource. In turn, the weighted graph 400 can be used to facilitate computation of contextual profiles for co-selected resources.

Figure 4:
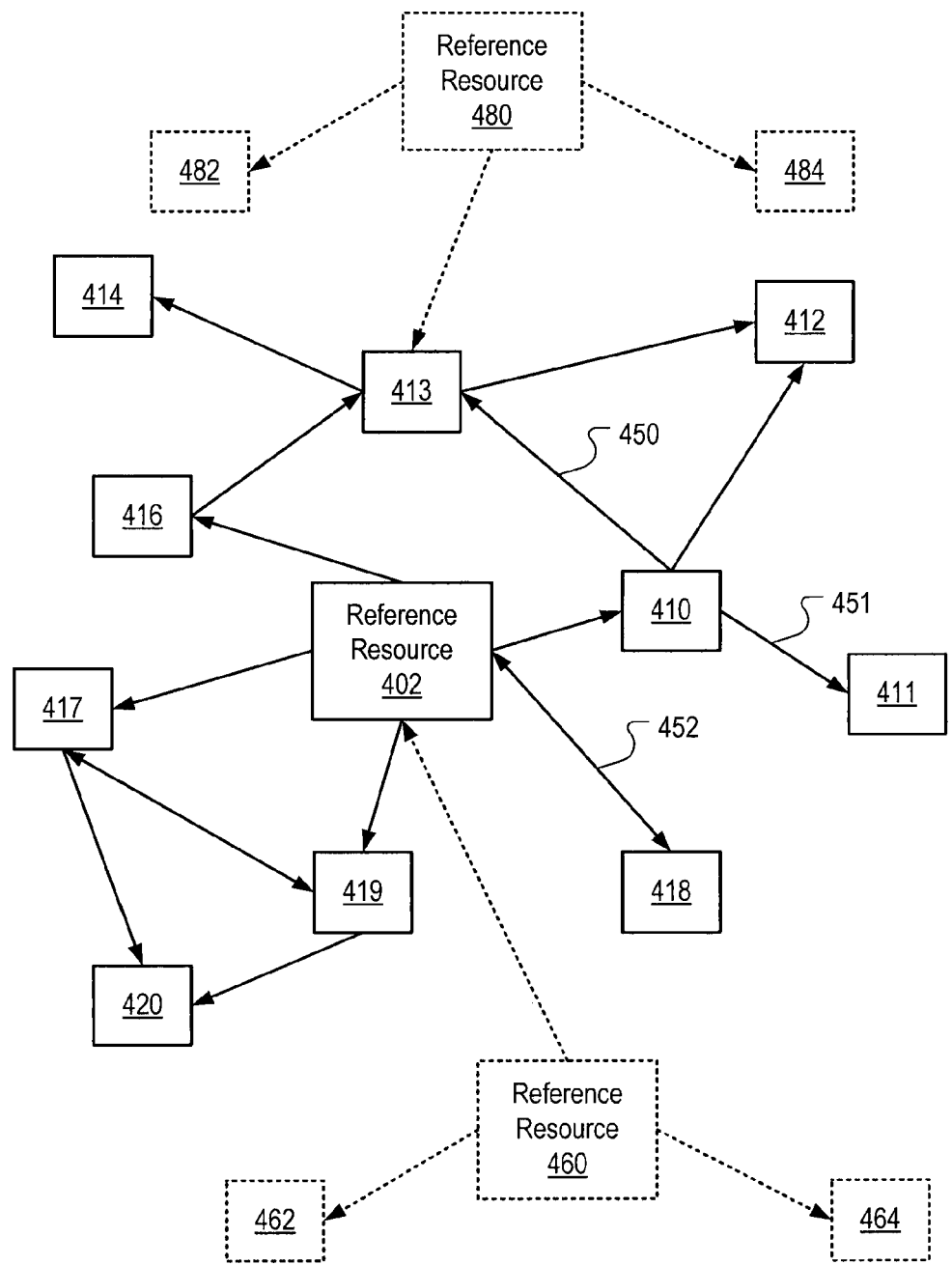
FIG. 4 is an illustration of a weighted graph generated using selection data.

FIG. 4 is an illustration of a weighted graph 400 generated using selection data. In some implementations, the weighted graph 400 is generated by the resource context system 120. For example, the resource context system 120 can obtain selection data from the historical data 120 that specifies selections of reference resources and selections of co-selected resources for the reference resource over multiple user sessions. The resource context system 120 defines nodes in the weighted graph 400 that represent the reference resource and the co-selected resources. In turn, the resource context system 120 generates and increments edge weights between nodes representing sequentially selected resources based on the selection data. Once the weighted graph 400 is generated, the weighted edges that connect nodes can be used to generate contextual profiles for resources that are represented by the connected nodes.

The weighted graph 400 includes a reference node 402 that represents a reference resource for which co-selected resources are being identified. The reference resource can be, for example, a reference having a contextual profile that satisfies a threshold confidence of accurately describing the content of the reference resource 402. The weighted graph also includes nodes 410-420 that represent co-selected resources for the reference resource. For example, each of the nodes 410-420 represents a resource that is a co-selected resource for the reference resource 402.

The weighted graph 400 can also include additional reference resources 460 and 480. When the additional reference resources 460 and 480 are identified and included in the weighted graph, co-selected resources are identified for each of the reference resources 402, 460 and 480, and edges to co-selected resources are weighted based on selections of the co-selected resources relative to each of reference resources. The additional reference resources 460 and 480 can represent resources that are also identified as having contextual profiles that accurately describe the content of the reference resources 460 and 480 with at least a threshold confidence.

Nodes representing sequentially selected resources are connected by edges in the weighted graph. For example, edge 450 connects the node 402 to the node 410 representing sequential user selections of the reference resource and the co-selected resource represented by the node 410. Similarly, edge 451 represents sequential selection of the co-selected resource represented by the node 411 subsequent to the selection of the co-selected resource represented by the node 410.

The edges can include directional components indicating a selection order. The node from which an edge originates is referred to as the source node (i.e., source resource) and was selected prior to the node at which the edge terminates, which is referred to as the destination node (i.e., destination resource). Continuing with the example above, the source node for the edge 450 is the reference node 402 and the destination node is node 410. Similarly, node 410 is the source node for the edge 451, while node 411 is the destination node. Each edge in the weighted graph 400 is represented by an arrow that points to the destination node.

A bidirectional edge is indicative of reciprocal sequential selections of the resources represented by the nodes. For example, the reference node 402 and node 418 are connected by a bidirectional edge 452. The bidirectional edge 452 is indicative of a user selection of the reference resource, followed by selections of the co-selected resource represented by node 418 and a second selection of the reference resource. Alternatively, a pair of unidirectional edges can be used instead of a bi-directional edge.

As described above, each of the edges can have a weight that is indicative of the number of sequential selections of the resources represented by the source and destination nodes, respectively. For example, if the resource represented by node 410 is selected ten times following selection of the reference resource, the edge 450 can have a weight corresponding to the ten selections.

The weight of an edge may be increased, for example, by a constant incremental amount in response to each identified selection or the weight may be increased based on a function of the number of selections. For example, the weight of an edge can correspond to the number of sequential selections of resources represented by the source and destination nodes or the weight can be a logarithmic function or an exponential of the number of sequential selections.

In some implementations, a reference weight can be assigned to each reference node. The reference weights are factors that represent a likelihood that the contextual profile for a resource is accurate. The reference weights can be computed and assigned based on an analysis of the contextual profile of the resource relative to relevance feedback data for the resource or other data indicating a context of the resource or an accuracy of the profile context.

For example, based on relevance feedback data, the contextual profile for reference resource 402 may be identified as being accurate with a probability of 0.7 (e.g., 70% of the relevance feedback data indicated that the contextual profile for reference resource 402 was accurate), while the contextual profile for reference resource 460 may be identified as accurate with a probability of 0.6. Therefore, reference resource 402 can be assigned a reference weight of 0.7, while reference resource 480 can be assigned a reference weight of 0.6.

The reference weights can be used, for example, to weight the contextual profile for a reference resource, thereby adjusting its effect for computing adjusted contextual profiles for other resources. For example, each topic weight in the contextual profile for reference resource 402 can be adjusted based on the reference weight of 0.6. In some implementations, each topic weight is adjusted based on a product of the topic weight and the reference weight. In other implementations, an exponential of the reference weight can be mathematically combined with each topic weight. Adjusting the topic weights based on the likelihood that the contextual profile for the reference resource is accurate can provide more accurate updated contextual profiles, as described in more detail with reference to FIG. 6.

Figure 5:
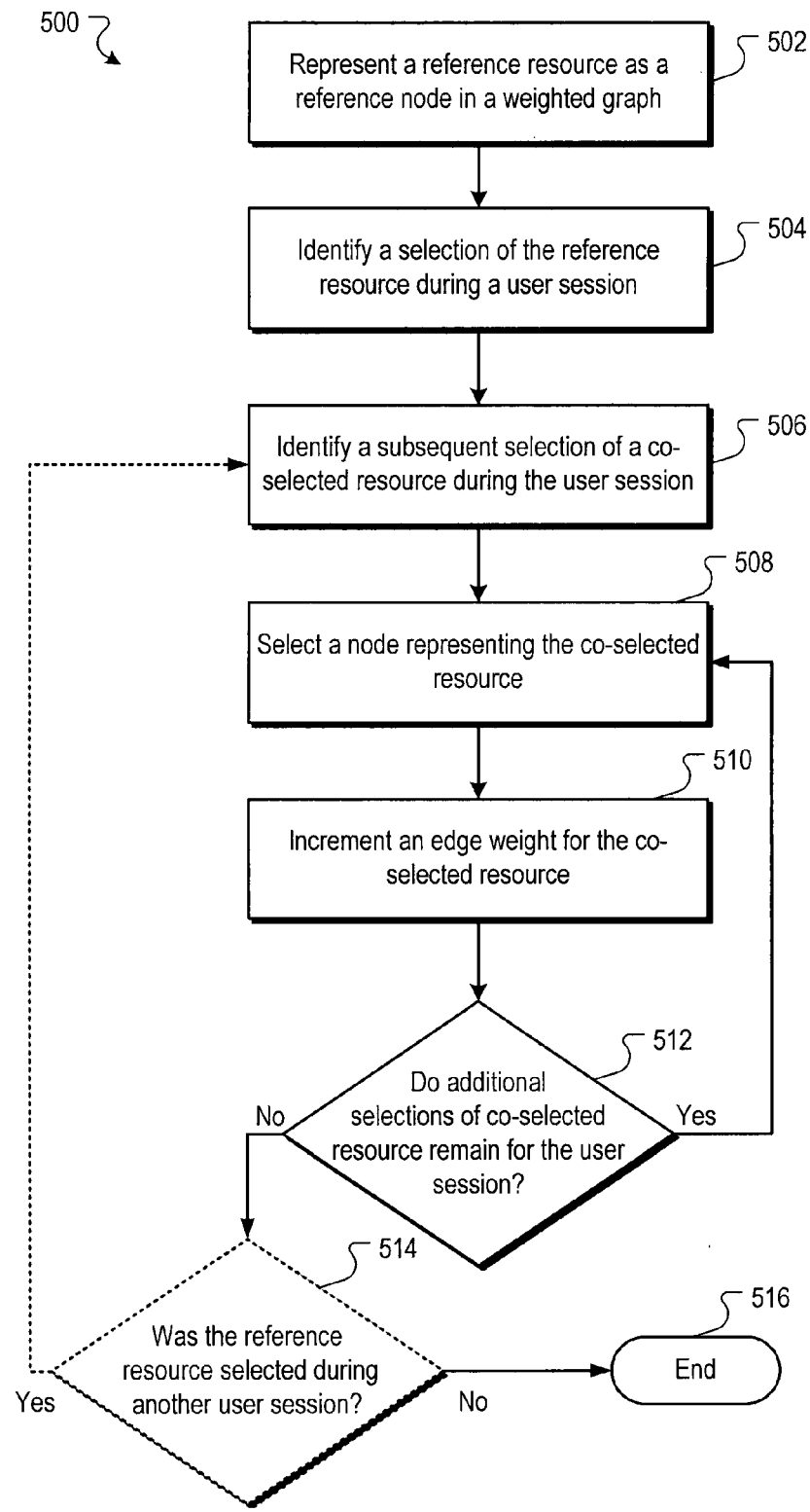
FIG. 5 is a flow chart of an example process for generating a weighted graph.

FIG. 5 is a flow chart of an example process 500 for generating a weighted graph. The weighted graph is used to identify relationships between resources based on resource selection order. The weighted graph is generated to include reference nodes that represent reference resources and other nodes representing co-selected resources. The weighted graph includes edges that represent sequential selections of resources during the same user session. Selection data for many different user sessions can be aggregated and represented in the weighted graph. The process 500 is described with reference to a single reference resource, but can be implemented with many different reference resources. The process 500 can be implemented, for example, by the resource context system 120 of FIG. 1.

A reference resource is represented as a reference node in a weighted graph (502). In some implementations, the reference resource is a resource that is identified as having a contextual profile that satisfies a confidence threshold. The reference resource can be identified, for example, from a data store storing resources and contextual profiles corresponding to the resource. Throughout the description of the process 500, nodes that represent resources can be characterized by the same characteristics (e.g., contextual profiles and selection data) as the resources that they represent. Therefore, nodes that represent the resources and the resources themselves are referred to interchangeably.

A user session, during which the reference resource was selected, is identified (504). In some implementations, the user session can be identified based on selection data for the reference resource. For example, a selection of the reference resource can be identified from selection data for the reference resource. In turn, the unique session identifier that is associated with the selection data for the reference resource can be used to identify other resources having selection data associated with the same unique session identifier. The selection data for the reference resource can be obtained, for example, from the historical data store 114.

Once the user session in which the reference resource was selected has been identified, selections of co-selected resources during the user session are identified (506). As described above, the selections of co-selected resources can be identified based on selection data associated with the same unique session identifier as the reference resource. The selection data for a user session can include time data that specifies when selection of a co-selected resource occurred relative to selection of the reference resource. Therefore, the time data can be used to identify co-selected resources as the resources that were selected at times prior to or following selection of the reference resource during a common user session.

In some implementations, only co-selected resources that were selected within a threshold time period following selection of the reference resource are identified as co-selected resources for the reference resource. The threshold time period facilitates use of selection data obtained for user sessions having a duration that is longer than the time period over which co-selected resources are to be identified.

For example, selection data may have been obtained for a user session having a duration of an hour. However, in a particular application, co-selection resources may be defined as only those resources that were selected within ten minutes of the selection of the reference resource. In this situation, the threshold time period can be used to determine whether a resource selected during the one hour user session can be identified as a co-selected resource for the reference resource. For example, the time between selection of the resource and selection of the reference resource can be compared to the threshold time period. If the time between the relative selections is less than or equal to the threshold, the resource is identified as a co-selected resource for the reference resource.

A node representing the co-selected resource is identified (508). In some implementations, the node representing the co-selected resource is defined in response to the first identified selection, for example, in a computer memory. In these implementations, after the node representing the co-selected resource is defined in the computer memory, the node can be identified from the computer memory location at which the node is defined. For example, the node can be defined in the weighted graph in response to the initial identified selection and then identified in the weighted graph for subsequent identified selections of the co-selected resource. In other implementations, each resource in a corpus of resources is initially represented by a node in the weighted graph, regardless of whether the resource is a co-selected resource.

When selections of the co-selected resource are identified, the node can be identified, for example, based on a unique identifier (e.g., URL) corresponding to the co-selected resource and associated with the node. For example, a unique resource identifier can be generated for each co-selected resource and associated with the resource and its corresponding node. When a selection of the co-selected resource is identified, the node that is associated with the unique identifier can be identified as representing the co-selected resource. Each of the co-selected resources are represented by independent nodes in the weighted graph and the nodes in a weighted graph can represent co-selected resources for reference resources during a single or multiple user sessions.

An edge weight is incremented for the co-selected resource (510). In some implementations, when the weighted graph is generated, the edge weight between each node can be initialized to zero (i.e., no edge exists between the nodes). Therefore, the first sequential selection of a co-selected resource will generate an edge having a weight corresponding to one standardized unit (e.g., a weight of 1). Additional sequential selections of the co-selected resource will similarly increment the weight of the edge connecting the nodes by an incremental amount corresponding to the standardized unit.

A determination is made as to whether additional selections of co-selected resources remain for the user session (512). The additional selections can be identified, for example, based on the selections being associated with a unique session identifier that corresponds to the user session.

When additional selections of co-selected resources remain for the user session, a node representing another co-selected resource is identified (508). When additional selections of co-selected resources do not remain for the user session, an optional determination is made as to whether the reference resource was selected during another user session (514). Another selection of the reference resource can be identified, for example, based on selection data for the reference resource, as described above. When another selection of the reference resource is identified, a sequential selection of a co-selected resource during the user session is identified (506). When another selection of the reference resource is not identified, the process 500 ends (516).

Once a weighted graph is generated, the weighted graph can be updated to represent additional selections of reference resources and co-selected resources for the additional reference resources. The weighted graph can be updated periodically based on an update condition being satisfied. The update condition can be, for example, a specified amount of time, user actions, user sessions, or other measure since the last update.

Contextual profiles can be generated for co-selected resources based on the edges that are connected to the nodes representing the resources in the weighted graph. In some implementations, the contextual profiles for a particular resource can be a sum of the contextual profiles for resources with which the particular resource is sequentially selected. In other implementations, the contextual profile for a particular resource can further be based on edge weights of edges that are connected to a node representing the particular resource, as described in more detail with reference to FIG. 6.

The weighted graph 400 and the process 500 have been described using reference resources that have contextual profiles that satisfy a confidence threshold. However, as described with reference to FIG. 2, each resource for which a contextual profile is available can be a reference resource for other resources that are sequentially selected with the reference resource. In these implementations, each node that represents a resource can be assigned a reference weight that represents a likelihood that the contextual profile for the resource is accurate. The reference weights can be used when computing updated contextual profiles for the co-selected resources for the reference resource, as described in more detail with reference to FIG. 6.

The weighted graph 400 and the process 500 have also been described as using sequential selections of resources by users to generate or weight links of the weighted graph. However, the links of the weighted graph 400 can be generated or weighted using other user actions relative to the resources. For example, links of the weighted graph can be generated based on selections of resources by the same user at any time during the same user session or within another defined period. Additionally, links between nodes of the weighted graph 400 can be generated or weighted based on other identified relationships between resources based, for example, on a set of rules with which links are defined. For example, links can be generated or weighted based on identification of html links from one resource to another, explicitly specified or identified links between resources by either publishers or users, or based on measures of other identified relationships between the resources.

Figure 6:
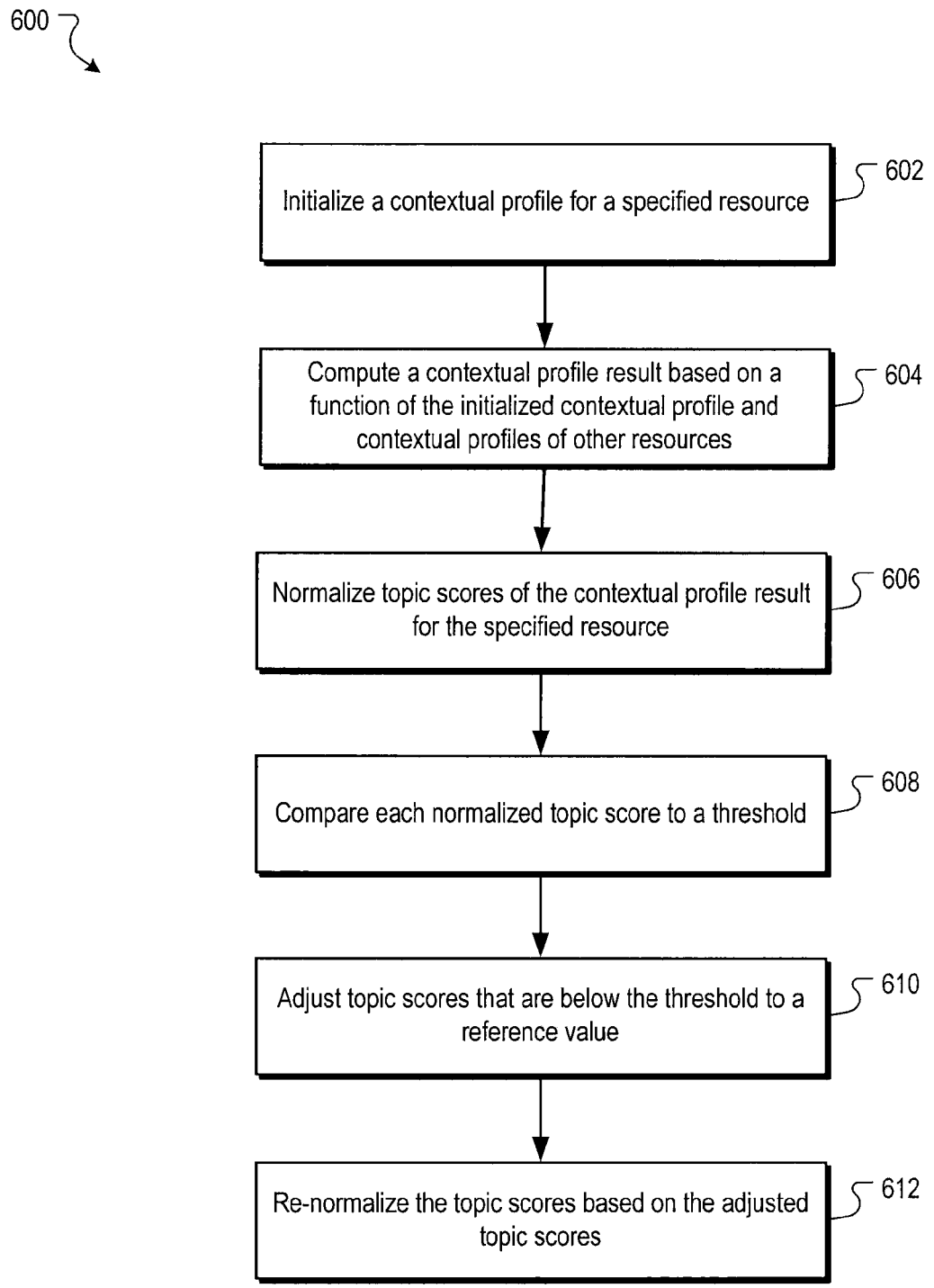
FIG. 6 is a flow chart of an example process for computing an updated contextual profile.

FIG. 6 is a flow chart of an example process 600 for computing an updated contextual profile. The process 600 includes initializing contextual profiles for a specified resource and computing a contextual profile result for the specified resource based on the contextual profiles of reference resources to which the specified resource is identified as relevant. Each topic score for the contextual profile result is then normalized, compared to a threshold and adjusted based on the threshold. The adjusted topic scores are then re-normalized and the contextual profile is defined as updated. The process 600 can be iteratively repeated until a stop condition occurs, as described with reference to FIG. 2.

The process 600 can be implemented, for example, by the resource context system 120 of FIG. 1. In some implementations, the resource context system 120 includes one or more processors that are configured to perform operations of the process 600. In other implementations, a computer readable medium can include instructions that when executed by a computer cause a computer to perform operations of the process 600.

An initialized contextual profile for a specified resource is selected (602). In some implementations, the specified resource is a co-selected resource for a reference resource. In other implementations, the specified resource can be other resources that are identified as relevant to a reference resource. The initialized contextual profile can be selected, for example, from a data store storing contextual profiles, such as the cached index 112 of FIG. 1.

In some implementations, the initialized contextual profile for the co-selected resource can be a contextual profile that includes initialized topic values. For example, initialized topic values can be topic values that are set to a default value, such as "0.0." Alternatively, the initialized topic values can be set to average topic values of other identified resources with which the co-selected resource has been sequentially selected.

In other implementations, the initialized topic values for the co-selected resource can be a previously computed contextual profile. For example, the initialized contextual profile can be a contextual profile that has been computed by a clustering system or previously computed for the co-selected resource, as described with reference to FIG. 2.

A contextual profile result is computed based on a function of the initialized contextual profile and contextual profiles of other resources (604). In some implementations, the other resources are resources that are identified as relevant to the specified resource. For example, the other resources can be resources that were selected prior to or following selection of the specified resource. The function by which the contextual profile result is computed can be a sum of the contextual profiles of reference resources with which the co-selected resource is sequentially selected.

For example, using a weighted graph, each node that is connected to the node representing the specified resource can be identified based on the weighted edges that connect to the co-selected resource. Each resource that is represented by the nodes that connect to the node for the specified resource can be identified as a reference resource for the specified resource. In turn, the contextual profiles for the reference resources can be identified and summed with the initial contextual profile for the specified resource. The result of the sum is defined as the contextual profile result. Other functions, such as logarithmic functions or exponential functions, can also be used to compute the contextual profile result.

In some implantations, the sum of the contextual profiles is a weighted sum. For example, each of the contextual profiles is weighted according to a reference weight for the resource. For example, each topic value in a contextual profile for a resource having a reference weight of 0.6 can be multiplied by 0.6, thereby reducing the effect of the weighted contextual profile for computing the contextual profile result.

In some implementations, the contextual profile for a reference resources can also be weighted based on a number of sequential selections of the reference resource and the specified resource. For example, each topic value in the contextual profile can be multiplied by a value representing a total number of sequential selections of the reference resource and the specified resource. Alternatively, the topic values can be multiplied by a ratio of the total number of sequential selections of the reference resource and the specified resource relative to a total number of selections of the specified resource.

The number of sequential selections of the reference resource and the specified resource can be identified, for example, based on the weighted edges that connect nodes of a weighted graph, as described with reference to FIG. 5. Additionally, the weight of the edges connecting the node for the specified resource to other nodes can be used to weight the contextual profiles of the other nodes for computing the contextual profile result for the specified node.

The topic scores of the contextual profile result for the co-selected resource are normalized (606). In some implementations, the topic scores are normalized by adjusting the values of the topic scores so that a sum of the topic scores equals 1.0. For example, if a contextual profile includes three topic scores 1.0, 3.0, and 6.0 for three corresponding topics A, B, and C, the topic scores can be scaled by a factor of 10 so that the sum of the scaled topic scores sum to 1.0 (i.e., 1.0/10+3.0/10+6.0/10=0.1+0.3+0.6=1.0). Other normalization scales and functions can be used.

Each of the normalized topic scores is compared to a topic score threshold (608). In some implementations, the topic score threshold that specifies a lowest topic score that a resource can have to be considered relevant to the topic. For example, the topic score threshold may specify that 0.29 is the lowest topic score that a resource can have for a topic to be considered relevant to the topic. In this example, the topic score 0.1 for topic A does not meet the topic score threshold of 0.29. Therefore, the resource is not identified as relevant to topic A.

Topic scores that are below the topic score threshold are adjusted to a reference value (610). In some implementations, the reference value can be set to 0.0 so that the contextual profiles will not include topic scores for topics to which references are not identified as relevant. Continuing with the above example, the topic score for topic A will be set to 0.0 indicating that the resource is not identified as relevant to topic A.

The topic scores are re-normalized based on the adjusted topic scores (612). In some implementations, the topic scores can be re-normalized so that the sum of the topic scores again equals 1.0 following adjustment of topic scores for topics to which the resource is not identified as relevant. Continuing with the above example, the topic scores for topics B and C can be normalized by multiplying the topic scores by 1.11 (i.e., 1.11*0.3+1.11*0.6=0.33+0.67=1.0).

As described above with reference to FIG. 2, the topic scores can be iteratively generated for each of the resources represented by nodes in the weighted graph until a stop condition occurs. The topic scores are iteratively generated to facilitate propagation of contextual profiles for the resources through the weighted graph. Once the stop condition occurs, the normalized topic scores can be defined as the updated contextual profile for the resource.

The functional operations described in this specification can be implemented in digital electronic circuitry, or in computer software, firmware, or hardware, including the structures disclosed in this specification and their structural equivalents, or in combinations of one or more of them. The operations also can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may include a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementations can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations have been described. Other implementations are within the scope of the following claims. For example, the actions recited in the claims can be performed in a different order and still achieve desirable results.

What is claimed is:

1. A computer-implemented method, comprising:
   identifying a reference resource and a contextual profile for the reference resource;
   determining that relevance feedback data for the reference resource has at least a threshold level of similarity to the contextual profile for the reference resource, the determination being based on a difference between the relevance feedback data and topics specified by the contextual profile, the relevance feedback data specifying one or more topics that users have identified as relevant to the reference resource;
   in response to the determination, computing, by a data processing device, a first contextual profile for a different resource based on the contextual profile for the reference resource; and
   providing the first contextual profile to a processing system that is configured to identify the different resource as relevant to at least one topic from the first contextual profile when at least one topic value in the first contextual profile meets a topic value threshold for the at least one topic, wherein:
      identifying the contextual profile for the reference resource comprises:
         identifying topic values for topics to which content of the reference resource has been identified as relevant by a clustering system; and
         identifying data specifying a cluster topic for a cluster to which a vector of terms for the resource is identified as relevant.

2. The method of claim 1, wherein the relevance feedback data for the reference resource specifies topics and corresponding measures of relevance of the reference resource to the topics based on user feedback.

3. The method of claim 1, wherein providing the first contextual profile to a processing system comprises providing the first contextual profile to a search system that references the different resource in search results for a search query based on the first contextual profile.

4. The method of claim 1, wherein providing the first contextual profile to a processing system comprises providing the first contextual profile to an advertisement management system that selects relevant advertisements for presentation with the different resource based on the first contextual profile.

5. A computer-implemented method, comprising:
   identifying a reference resource and a contextual profile for the reference resource;
   determining that relevance feedback data for the reference resource has at least a threshold level of similarity to the contextual profile for the reference resource, the determination being based on a difference between the relevance feedback data and topics specified by the contextual profile, the relevance feedback data specifying one or more topics that users have identified as relevant to the reference resource;
   in response to the determination, computing, by a data processing device, a first contextual profile for a different resource based on the contextual profile for the reference resource; and
   providing the first contextual profile to a processing system that is configured to identify the different resource as relevant to at least one topic from the first contextual profile when at least one topic value in the first contextual profile meets a topic value threshold for the at least one topic, wherein:
      identifying a reference resource comprises identifying a resource that was sequentially selected for presentation relative to selection of the different resource; and
      computing a first contextual profile comprises:

representing the reference resource and the different resource as nodes in a weighted graph, the node for the different resource being connected to the reference resource by a weighted edge representing sequential selections of the different resource and the reference resource; and computing the first contextual profile based on a function of the weighted edge connected to the node for the different resource and the reference contextual profile for the reference resource.

6. The method of claim 5, wherein the weighted edge includes directional components indicating a source resource and a destination resource for each sequential selection of the different resource and the reference resource, the source resource being a resource that was selected for presentation prior to the destination resource being selected for presentation.

7. A computer-implemented method comprising:
identifying a reference resource and a contextual profile for the reference resource;
determining that relevance feedback data for the reference resource has at least a threshold level of similarity to the contextual profile for the reference resource, the determination being based on a difference between the relevance feedback data and topics specified by the contextual profile, the relevance feedback data specifying one or more topics that users have identified as relevant to the reference resource;
in response to the determination, computing, by a data processing device, a first contextual profile for a different resource based on the contextual profile for the reference resource;
normalizing topic values of the first contextual profile to normalized topic values for the first contextual profile, the normalized topic values being values on a normalized scale;
adjusting, to a baseline value, each of the normalized topic values that is less than a first topic value threshold;
re-normalizing the normalized topic values having values that are different than the baseline value subsequent to the adjusting; and
re-computing the first contextual profile based on a function of the re-normalized topic values and the contextual profile for the reference resource.

8. The method of claim 7, wherein re-computing the first contextual profile comprises summing the contextual profile for the reference resource and the re-normalized topic values.

9. A system, comprising:
a data store storing contextual profiles for resources, the contextual profiles specifying topic values that represent measures of relevance of the resources to each of a plurality of topics and
a resource context system coupled to the data store, the resource context system including at least one processor configured to perform operations comprising:
identifying, from the data store, a reference resource and a contextual profile for the reference resource;
determining that relevance feedback data for the reference resource has at least a threshold level of similarity to the contextual profile for the reference resource, the determination being based on a difference between the relevance feedback data and topics specified by the contextual profile, the relevance feedback data specifying one or more topics that users have identified as relevant to the reference resource;
in response to the determination, computing a first contextual profile for a different resource based on the contextual profile for the reference resource; and
providing the first contextual profile to a processing system that is configured to identify the different resource as relevant to at least one topic from the first contextual profile when at least one topic value in the first contextual profile meets a topic value threshold for the at least one topic, wherein computing the first contextual profile comprises:
representing the reference resource and the different resource as nodes in a weighted graph, the node for the different resource being connected to the reference resource by a weighted edge representing sequential selections of the different resource and the reference resource; and
computing the first contextual profile based on a function of the weighted edge and the contextual profile for the reference resource.

10. The system of claim 9, wherein the resource context system is further configured to perform operations comprising computing the first contextual profile based on a function of initial topic values for the different resource.

11. The system of claim 9, wherein the resource context system is further configured to perform operations comprising:
initializing topic values for the different resource to initial topic values; and
computing the first contextual profile based on a function of the initial topic values and the contextual profile for the reference resource.

12. A system, comprising:
a data store storing contextual profiles for resources, the contextual profiles specifying topic values that represent measures of relevance of the resources to each of a plurality of topics and
a resource context system coupled to the data store, the resource context system including at least one processor configured to perform operations comprising:
identifying, from the data store, a reference resource and a contextual profile for the reference resource;
determining that relevance feedback data for the reference resource has at least a threshold level of similarity to the contextual profile for the reference resource, the determination being based on a difference between the relevance feedback data and topics specified by the contextual profile, the relevance feedback data specifying one or more topics that users have identified as relevant to the reference resource;
in response to the determination, computing a first contextual profile for a different resource based on the contextual profile for the reference resource;
normalizing topic values of the first contextual profile to normalized topic values for the first contextual profile, the normalized topic values being values on a normalized scale;
adjusting, to a baseline value, each of the normalized topic values that is less than a first topic value threshold;
re-normalizing the topic values based on the adjusted topic values and
providing the first contextual profile to a processing system that is configured to identify the different resource as relevant to at least one topic from the first contextual profile when at least one topic value in the first contextual profile meets a topic value threshold for the at least one topic.

13. A non-transitory computer readable storage medium encoded with a computer program comprising instructions that when executed operate to cause a computer to perform operations:

identifying a reference resource and a contextual profile for the reference resource;

determining that relevance feedback data for the reference resource has at least a threshold level of similarity to the contextual profile for the reference resource, the determination being based on a difference between the relevance feedback data and topics specified by the contextual profile, the relevance feedback data specifying one or more topics that users have identified as relevant to the reference resource;

in response to the determination, computing, by a data processing device, a first contextual profile for a different resource based on the contextual profile for the reference resource;

normalizing the topic values of the first contextual profile to normalized topic values for the first contextual profile, the normalized topic values being values on a normalized scale;

adjusting, to a baseline value, each of the normalized topic values that is less than a first topic value threshold; and re-normalizing the normalized topic values having values that are different than the baseline value subsequent to the adjusting;

providing the first contextual profile to a processing system that is configured to identify the different resource as relevant to at least one topic from the first contextual profile when at least one topic value in the first contextual profile meets a topic value threshold for the at least one topic.

* * * * *

UNITED STATES PATENT AND TRADEMARK OFFICE
CERTIFICATE OF CORRECTION

PATENT NO.      : 8,620,929 B2
APPLICATION NO. : 12/541222
DATED           : December 31, 2013
INVENTOR(S)     : Shon et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 274 days.

Signed and Sealed this
Twelfth Day of May, 2015

Michelle K. Lee
*Director of the United States Patent and Trademark Office*